I. C. RUST.
MECHANICAL MOVEMENT.
APPLICATION FILED JULY 27, 1908.
913,918.
Patented Mar. 2, 1909.
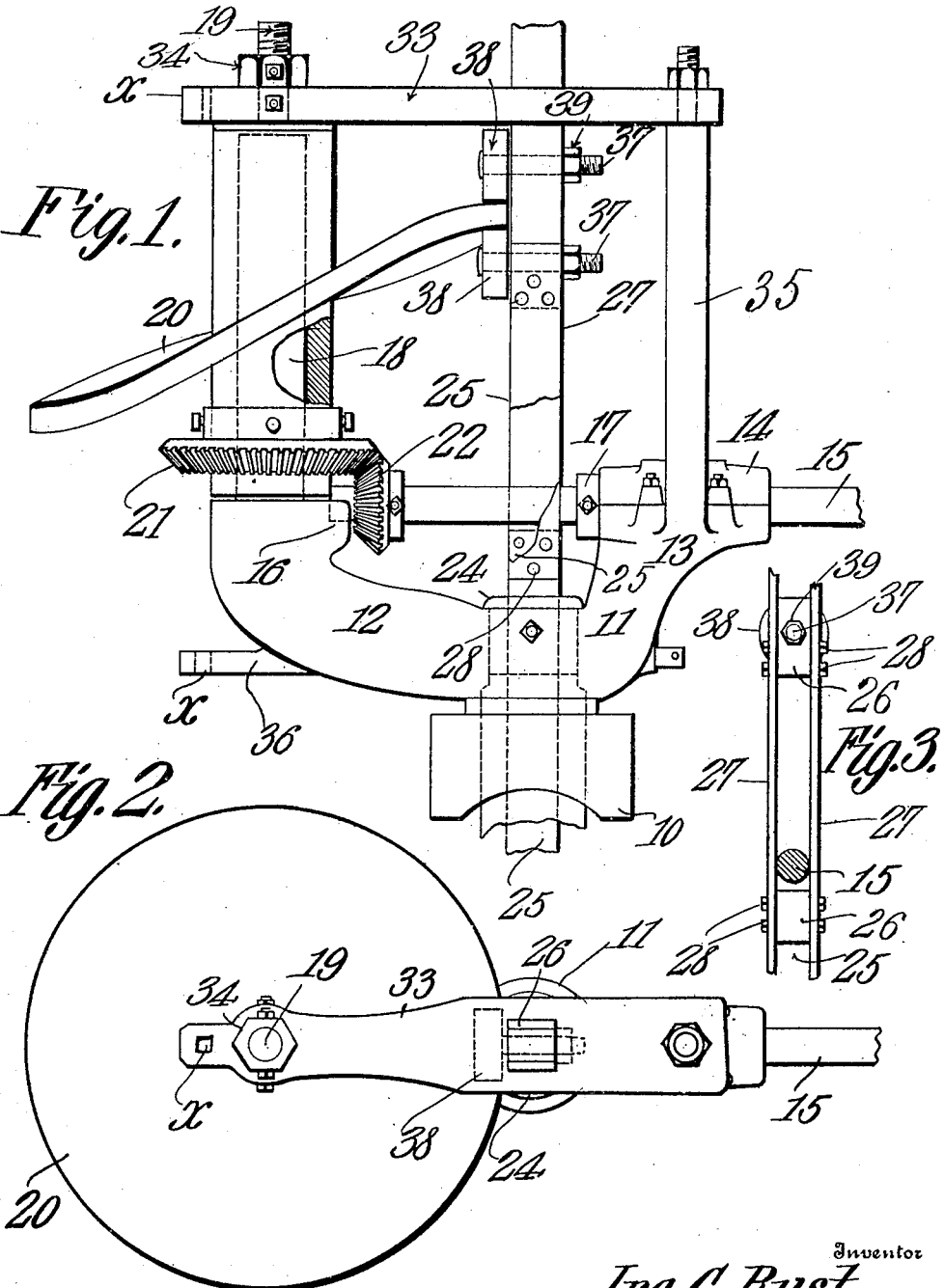
Witnesses
Inventor
Ira C. Rust.

UNITED STATES PATENT OFFICE.

IRA C. RUST, OF FARMLAND, INDIANA, ASSIGNOR OF ONE-FOURTH TO CHARLES A. MENDENHALL AND ONE-FOURTH TO EDWARD J. MENDENHALL, BOTH OF FARMLAND, INDIANA.

MECHANICAL MOVEMENT.

No. 913,918.      Specification of Letters Patent.      Patented March 2, 1909.

Application filed July 27, 1908. Serial No. 445,558.

*To all whom it may concern:*

Be it known that I, IRA C. RUST, a citizen of the United States, residing at Farmland, in the county of Randolph and State of Indiana, have invented a new and useful Mechanical Movement, of which the following is a specification.

This invention relates to mechanism of that general type employed for transmitting motion from a wind mill to a pump or other device to be operated.

The principal object of the invention is to provide a mechanism of simple construction whereby the rotary movement of the wind mill may be transformed into vertical reciprocatory movement without jar or shock and in which the various parts are so connected and arranged as to mutually brace and support each other.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation partly in section of a wind mill gear constructed in accordance with the invention. Fig. 2 is a plan view of the same. Fig. 3 is a detail perspective view of the upper portion of the vertical pump rod.

Similar characters of reference are employed to indicate corresponding parts throughout the several figures of the drawings.

Mounted at the head of the tower or other supporting frame 10 is a frame 11 that is free to revolve as dictated by the change in direction of the currents of air. This frame has two oppositely directed arms 12 and 13, the latter carrying a journal box 14 for the reception of the wind mill shaft 15. The arm 12 is provided with a semi-circular socket 16 that receives the rear end of the shaft, and the vertical wall of the socket serves to prevent endwise movement of the shaft in one direction while movement in the opposite direction is prevented by a collar 17 on the shaft.

At the top of the bracket 12 is a cylindrical stud 18, and the upper end of this stud is reduced to form a threaded pin 19. The stud serves for the reception of a cam wheel 20 having a single web or tooth in the form of a return helix. Secured to the lower end of the hub of this wheel by set screws is a bevel gear 21 that intermeshes with a bevel pinion 22 on the wind mill shaft 15, and the intermeshing of these two gears will serve to hold the inner end of the shaft 15 down in the socket 16. As the two gears are held in place by set screws one or both may be readily removed for the substitution of others of different diameter, if required.

The central portion of the frame 11 has a vertical opening for the reception of a bushing 24, and the latter has a square opening for the passage of a vertically disposed rod 25 which may be connected to a pump or other device to be operated. The rod is formed of a pair of plates 27, that are held in spaced relation by blocks 26. These plates straddle the shaft 15, the distance between the inner faces of the plates being but slightly greater than the diameter of the shaft so that each will serve as a guide and partial brace for the other. The upper end of the rod is guided in an opening formed in a bracing bar 33 that extends over the wheel 20 and is provided with an opening for the passage of the threaded pin 19. This brace is locked in place by nuts 34, which serve also to prevent upward movement of the cam wheel. The opposite end of the brace 33 is bolted to the upper end of a standard 35 that projects upward from the arm 11 of the frame. Both the brace 33 and a lower arm 36 on the frame are provided with suitable openings $x$ for the reception of the guiding vane of the wind mill.

The upper block of the vertical rod 25 is provided with openings for the reception of bolts 37 on which are mounted anti-friction rollers 38 and said bolts are confined in place by nuts 39. The anti-friction rollers fit on opposite sides of the single tooth or web of the wheel 20 and as the latter is rotated the movement will be transmitted to the rod 25 in the form of vertical reciprocatory motion that may be utilized at the bottom of the rod for the purpose of operating a pump or the like.

While the apparatus described is particularly advantageous for use in connection with wind mills it may be employed in mechanism of different type for converting rotary into reciprocatory movement.

What is claimed is:—

1. In apparatus of the class described, a frame having a journal box and a bearing socket said frame having a central opening, a bushing mounted in the opening and having a non-circular passage extending therethrough, a driving shaft mounted in the journal box and socket, a bevel pinion on said shaft, a reciprocatory rod guided in the bushing said rod being formed of a pair of spaced plates straddling the shaft, a pair of anti-friction rollers carried by the rod, a post carried by the frame and terminating in a reduced threaded pin, a cam wheel mounted on the post and engaging the anti-friction rollers, a bevel gear carried by the wheel and intermeshing with the pinion, a standard rising from the frame in advance of the rod, and a brace secured to the threaded pin and the standard and having an opening for the passage of the rod.

2. In apparatus of the class described, a frame having a central opening, a bushing mounted in said opening, a driving shaft journaled in the frame, a reciprocatory rod guided in the bushing, said rod being formed with an opening for the passage of the shaft, projections on the rod, a post rising from the frame, a cam wheel mounted on the post and engaging the projections on the rod, gearing between said cam wheel and the driving shaft, a standard rising from the frame in advance of the rod, and a brace secured to the post and the standard, and having an opening for the passage of the rod.

In testimony that I claim the foregoing as my own, I have hereto affixed my signature in the presence of two witnesses.

IRA C. RUST.

Witnesses:
 ROBERT P. ARRIEK,
 DAVID F. FORD.